US010075998B2

(12) United States Patent
Azizi et al.

(10) Patent No.: US 10,075,998 B2
(45) Date of Patent: Sep. 11, 2018

(54) WIRELESS DEVICE, METHOD, AND COMPUTER READABLE MEDIA FOR SIGNALING A RESOURCE ALLOCATION IN A HIGH EFFICIENCY WIRELESS LOCAL-AREA NETWORK

(71) Applicant: Intel IP Corporation, Santa Clara, CA (US)

(72) Inventors: Shahrnaz Azizi, Cupertino, CA (US); Eldad Perahia, Portland, OR (US); Thomas J. Kenney, Portland, OR (US); Chittabrata Ghosh, Fremont, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 45 days.

(21) Appl. No.: 14/864,633

(22) Filed: Sep. 24, 2015

(65) Prior Publication Data

US 2016/0338061 A1 Nov. 17, 2016

Related U.S. Application Data

(60) Provisional application No. 62/161,301, filed on May 14, 2015.

(51) Int. Cl.
*H04W 4/00* (2018.01)
*H04W 84/12* (2009.01)
*H04W 72/04* (2009.01)

(52) U.S. Cl.
CPC ......... *H04W 84/12* (2013.01); *H04W 72/042* (2013.01); *H04W 72/048* (2013.01)

(58) Field of Classification Search
CPC ..... H04W 16/02; H04W 16/04; H04W 16/06; H04W 16/08; H04W 16/10; H04W 16/12; H04W 28/16; H04W 28/26; H04W 72/042; H04W 72/0446; H04W 72/0453
See application file for complete search history.

(56) References Cited

U.S. PATENT DOCUMENTS 9,497,117 B2 * 11/2016 Goyal .................. G06N 5/02
2009/0232075 A1 * 9/2009 Konta .................. H04L 5/0096
370/329

(Continued)

*Primary Examiner* — Alvin Zhu
(74) *Attorney, Agent, or Firm* — Schwegman Lundberg & Woessner, P.A.

(57) ABSTRACT

Apparatuses, computer readable media, and methods for indicating a resource allocation are disclosed. An apparatus of a high-efficiency wireless local area network (HEW) master station is disclosed. The HEW master station includes circuitry configured to generate a resource allocation for HEW stations, where the resource allocation includes a group identification and an index into a table. The circuitry is further configured to transmit the resource allocation to the HEW stations. The table may be a permutation table that indicates a sub-channel of a bandwidth for each of the HEW stations. The HEW master station may be configured to operate in accordance with orthogonal frequency division multi-access (OFDMA). The resource allocation may be part of a trigger frame that includes a duration for an uplink or downlink transmission opportunity, and the circuitry may be further configured to transmit data to the HEW stations in accordance with the resource allocation.

25 Claims, 8 Drawing Sheets

(56) References Cited

U.S. PATENT DOCUMENTS

| | | | |
|---|---|---|---|
| 2014/0188973 A1* | 7/2014 | Goyal | G06N 5/02 709/201 |
| 2016/0073387 A1* | 3/2016 | Yang | H04L 5/0048 370/329 |
| 2017/0238286 A1* | 8/2017 | Chun | H04W 72/042 370/329 |
| 2017/0289962 A1* | 10/2017 | Kim | H04W 72/04 |

* cited by examiner

WIRELESS DEVICE, METHOD, AND COMPUTER READABLE MEDIA FOR SIGNALING A RESOURCE ALLOCATION IN A HIGH EFFICIENCY WIRELESS LOCAL-AREA NETWORK

PRIORITY CLAIM

This application claims the benefit of priority under 35 USC 119(e) to U.S. Provisional Patent Application Ser. No. 62/161,301, filed May 14, 2015, which is incorporated herein by reference in its entirety.

TECHNICAL FIELD

Embodiments pertain to wireless networks. Some embodiments relate to transmitting and receiving packets in wireless local area networks (WLANs) including networks operating in accordance with the Institute of Electronic and Electrical Engineers (IEEE) 802.11 family of standards. Some embodiments relate to IEEE 802.11ax. Some embodiments relate to orthogonal frequency division multiple-access (OFDMA) and/or multi-user multiple-input multiple-output (MU-MIMO). Some embodiments relate to signaling resource allocations or sub-channels. Some embodiments relate to signaling group identification, group identification number, and a resource allocation.

BACKGROUND

One issue in wireless local area networks (WLANs) is efficiently using the wireless network. The WLAN may support multiple stations transmitting at the same time coordinated by a master station. Additionally, the wireless network may support different protocols including legacy protocols.

Thus, there are general needs for systems and methods for efficiently using the wireless medium, and in particularly, to indicate a resource allocation.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
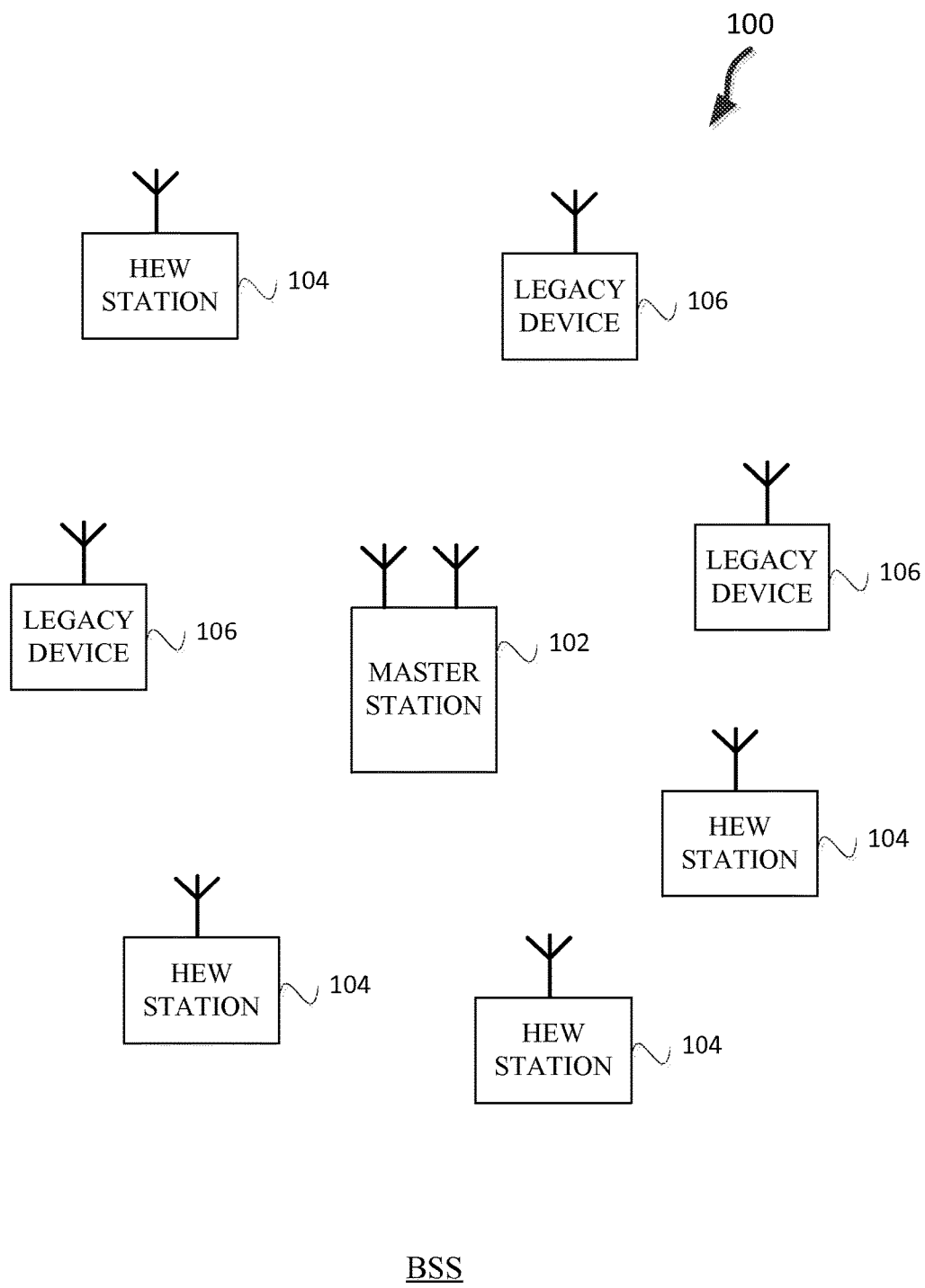
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT). In some embodiments, subchannels may be comprised of tones that are not contiguous.

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the master station 102 and/or HEW stations 104 are configured to perform one or more of the functions and/or methods described herein in conjunction with FIGS. 1-9.

Figure 2:
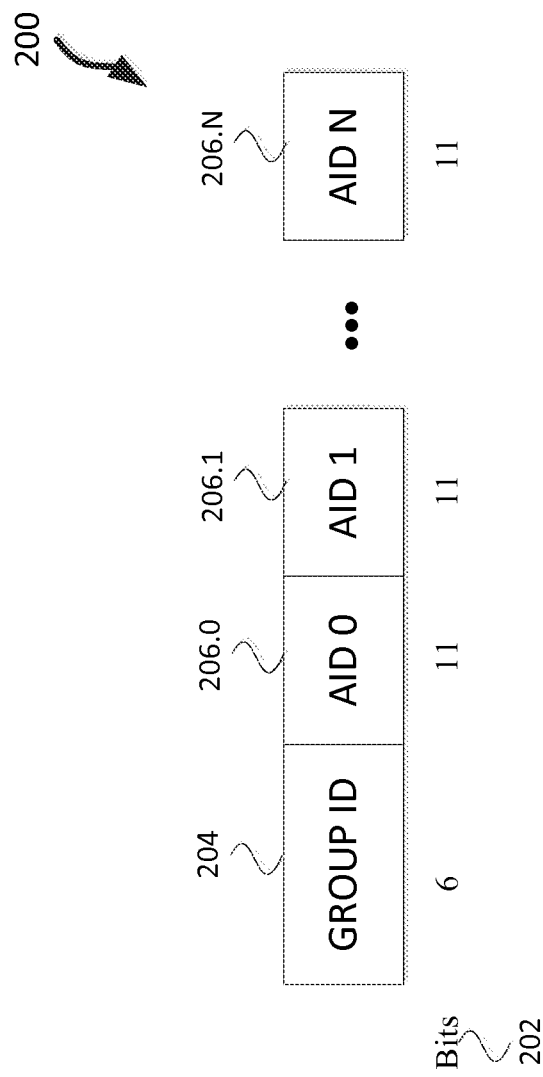
FIG. 2 illustrates a group definition in accordance with some embodiments.

FIG. 2 illustrates a group definition 200 in accordance with some embodiments. Illustrated in FIG. 2 is group definition 200 and bits 202. The group definition 200 comprises a group identification (ID) 204, AID 0 206.0, and AID 1 206.1 through AID N 206.N. AID 0 206.0 and AID 1 206.1 through AID N 206.n may be identifications of HEW stations 104 such as an association IDs. The group ID 204 may be 6 bits as illustrates or another number of bits that may be based on a number of possible groups.

The group ID 204 may be used by the master station 102 to address the HEW station 104 identified by AID 0 206.0 and AID 206.1 and through AID N 206.n. AID 0 206.0 and AID 206.1 through AID 206.n may be 11 bits 202 or another number of bits to represent an identification of a HEW station 104. The HEW stations 104 may determine that a resource allocation is intended for the HEW station 104 based on the group ID 204. In some embodiments the group ID 204 may be used for signaling resource allocations when OFDMA is used. In some embodiments a different identification may be used to identify HEW STAs 104 for signaling resource allocations for MU-MIMO and/or OFDM. A HEW STA 104 may be assigned to more than one group ID 204. The HEW STAs 104 may be assigned to a same group ID 204 based on one or more of the following: similar signal to noise ratio, similar up/down link characteristics, etc.

Figure 3:
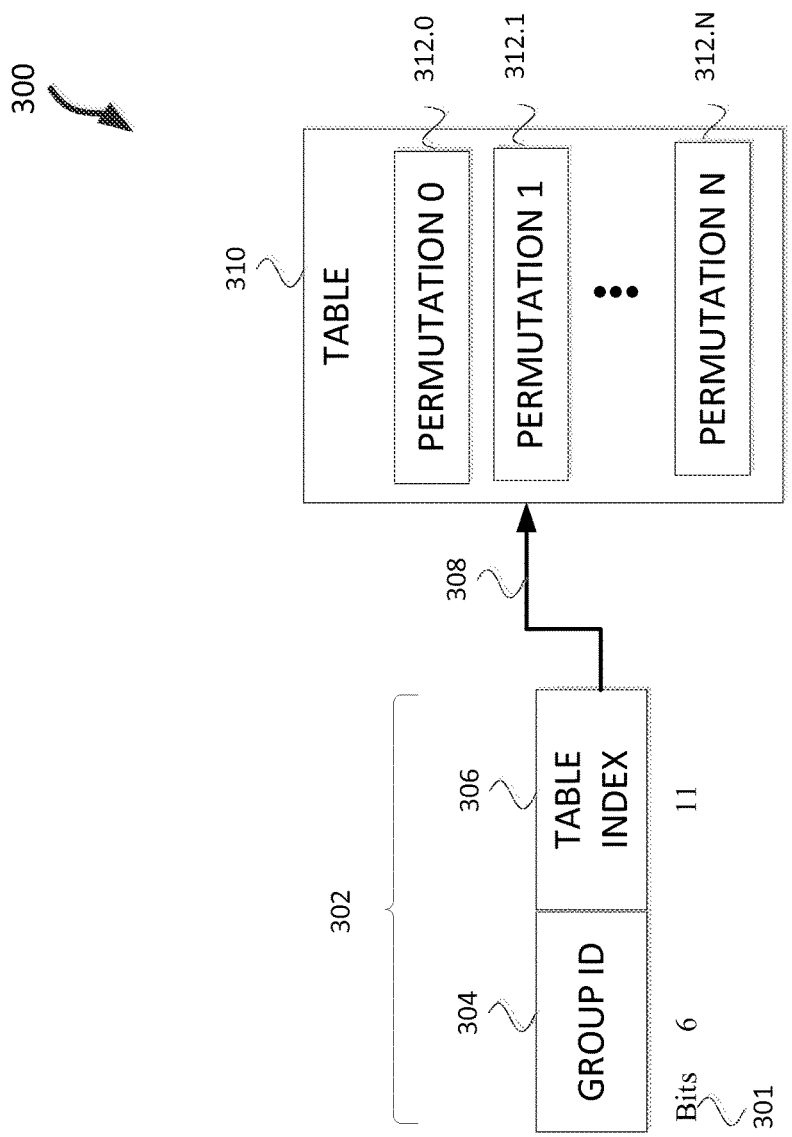
FIG. 3 illustrates a resource allocation and a table in accordance with some embodiments.

FIG. 3 illustrates a resource allocation 302 and a table 310 in accordance with some embodiments. The resource allocation 302 comprises a group ID 304 and a table index 306. The group ID 304 may be similar or the same group ID 204 as disclosed in conjunction with FIG. 2. The table index 306 may be an index 308 into the table 310. For example, the table index 306 may be an integer such as 1, which would correspond to permutation 1 312.1 in table 310. The group ID 304 may be 6 bits 301 and the table index 306 may be 11 bits 301. The table index 306 may be a ceiling to a log base 2 of a largest size of the table 310. The group ID 304 may be a different number of bits. The number of bits 301 of the group ID 304 may depend on a number of group IDs 304 that may be used. In some embodiments the maximum number of HEW STAs 104 in a group is 16 or 18.

Table 310 may be a table of permutations that indicates a resource allocation for the HEW STA 104. The table 310 may be stored locally on both the master station 102 and the HEW STA 104. The table 310 may comprises permutation 0 312.0 and permutation 1 312.1 through permutation n 312.n. The table 310 may be generated based on the group formed by the master station 102. The table 310 may be generated by the HEW STA 104 based on a sub-channel design indicated by the master station 102.

The table 310 may include an indication of all resource allocations that can be signaled using the resource allocation 302. The table 310 may include all permutations that may be signaled with the resource allocation 302. In some embodiments, different permutations 312 of the table 310 may indicate different resource allocation designs. In some embodiments, a resource allocation design may be signaled separately from the resource allocation 302. In some embodiments the table 310 may include all possible allowable permutations of OFDMA allocations for each group ID 304.

Figure 4:
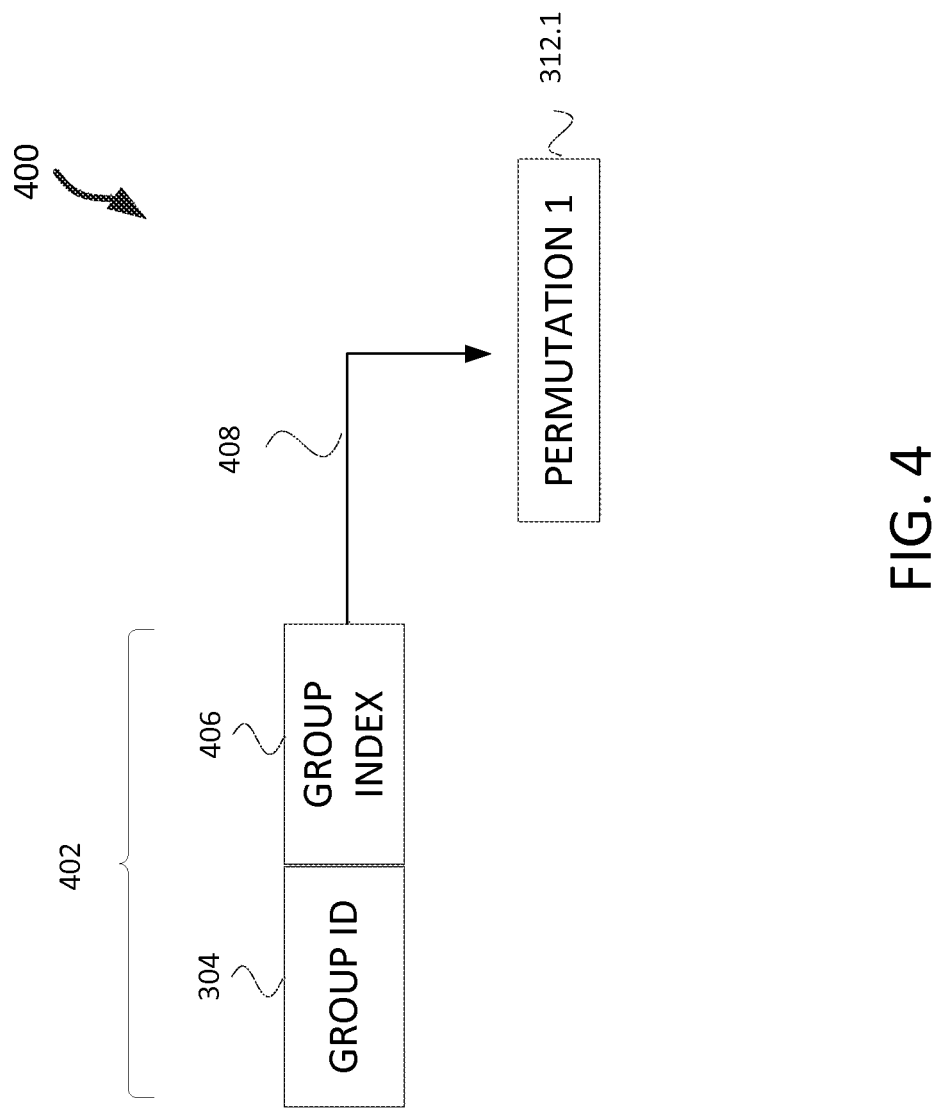
FIG. 4 illustrates an identification for a HEW station in accordance with some embodiments.

FIG. 4 illustrates an identification 402 for a HEW station 104 in accordance with some embodiments. Illustrated in FIG. 4 is an identification 402 and permutation 312.1. The identification 402 may include a group ID 304 and a group index 406. The group ID 304 may the same or similar to the group ID 304 as disclosed in conjunction with FIG. 3. The group index 406 may be an indication of a group number of the HEW STA 104. For example, group index 406 may be 1 to indicate that the HEW STA 104 is member 1 of group ID 304. The group index 406 may be used to index 408 into the permutation 1 312.1. For example, the HEW STA 104 may use the table index 306 to determine a permutation 312 and then use the group index 406 to determine which resource allocation indicated in the permutation 312 is for the HEW STA 104. In some embodiments the group index 406 is not used to determine the location of the resource allocation in the permutation 312.

The permutation 312 may be a tuple of the group index 406 and a resource allocation with the location of the tuple indicating the location of the resource allocation in the sub-channel design. Alternatively, the permutation 312 may be a tuple of a location of the resource allocation in the sub-channel design and an indication of the size of the resource allocation. The permutation 312 may have other designs where the HEW STA 104 may use the group index 406 and group ID 304 to determine a resource allocation. For example, the permutation 312 may be a tuple of an indication of a position of resource allocation and a sub-channel design with the group index 406 being used to determine the tuple for the HEW STA 104.

Figure 5:
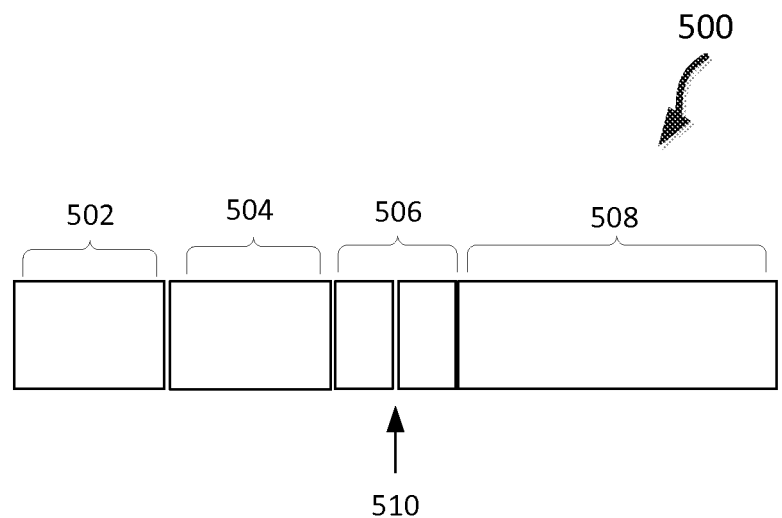
FIGS. 5 and 6 illustrate permutations in accordance with some embodiments.
Figure 6:
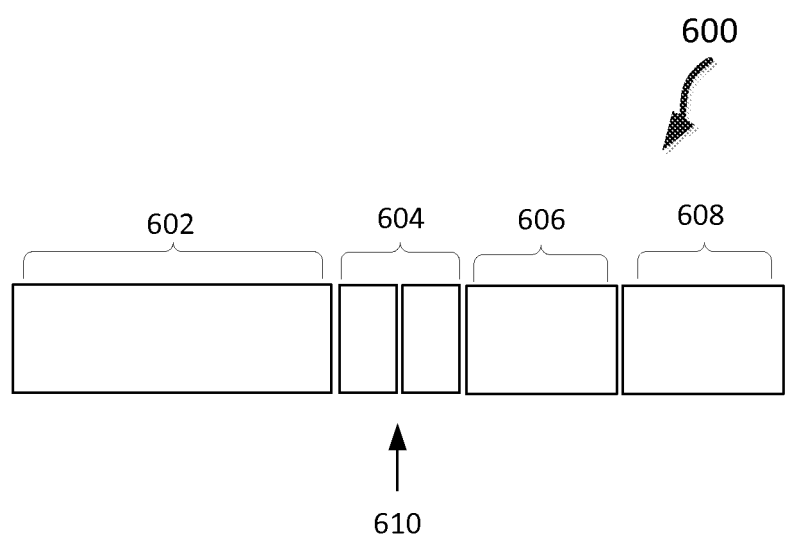

FIGS. 5 and 6 illustrate permutations 500, 600 in accordance with some embodiments. Permutations 500, 600 illustrate an example where the master station 102 may intend to allocate sub-channels of 52 tones, 52 tones, 26 tones, and 108 tones to four HEW STAs 104. The four HEW STAs 104 may be in one group. The table 310 (FIG. 3) then would include different permutations 500, 600 of 52 tones, 52 tones, 26 tones, and 108 tones. The DCs 510, 610 may include tones that are not part of a RA. The DCs 510, 610 may be one or more null tones.

In one table 310 design permutation 500 may include 52 tone resource allocation (RA) 502 (for Group Member A), 52 tone RA 504 (for Group Member B), 26 tone RA 506 (for Group Member C), and 108 tone RA 508 (for Group Member D). Permutation 600 may include 108 tone RA 602 (for Group Member D), 26 tone RA 604 (for Group Member C), 52 tone RA 606 (for Group Member A), and 52 tone RA 608(for Group Member B). HEW STA 104 that is group member A would then be assigned RA 502 for permutation 500 and RA 606 for permutation 600. In this way, the master station 102 may select a permutation of the sub-channel design for the group of four HEW STAs 104.

The RAs may not be contiguous tones. There may be tones that are used for different purposes (e.g., guard tones) or that are unused between tones used for the RA. Moreover, there may be tones on either side of an RA that are used for different purposes (e.g., guard tones) or that are unused.

The permutations 500, 600 may be different to enable the HEW STAs 104 to determine their corresponding RA with the group ID 304 and group index 406 as disclosed in conjunction with FIG. 4.

Figure 7:
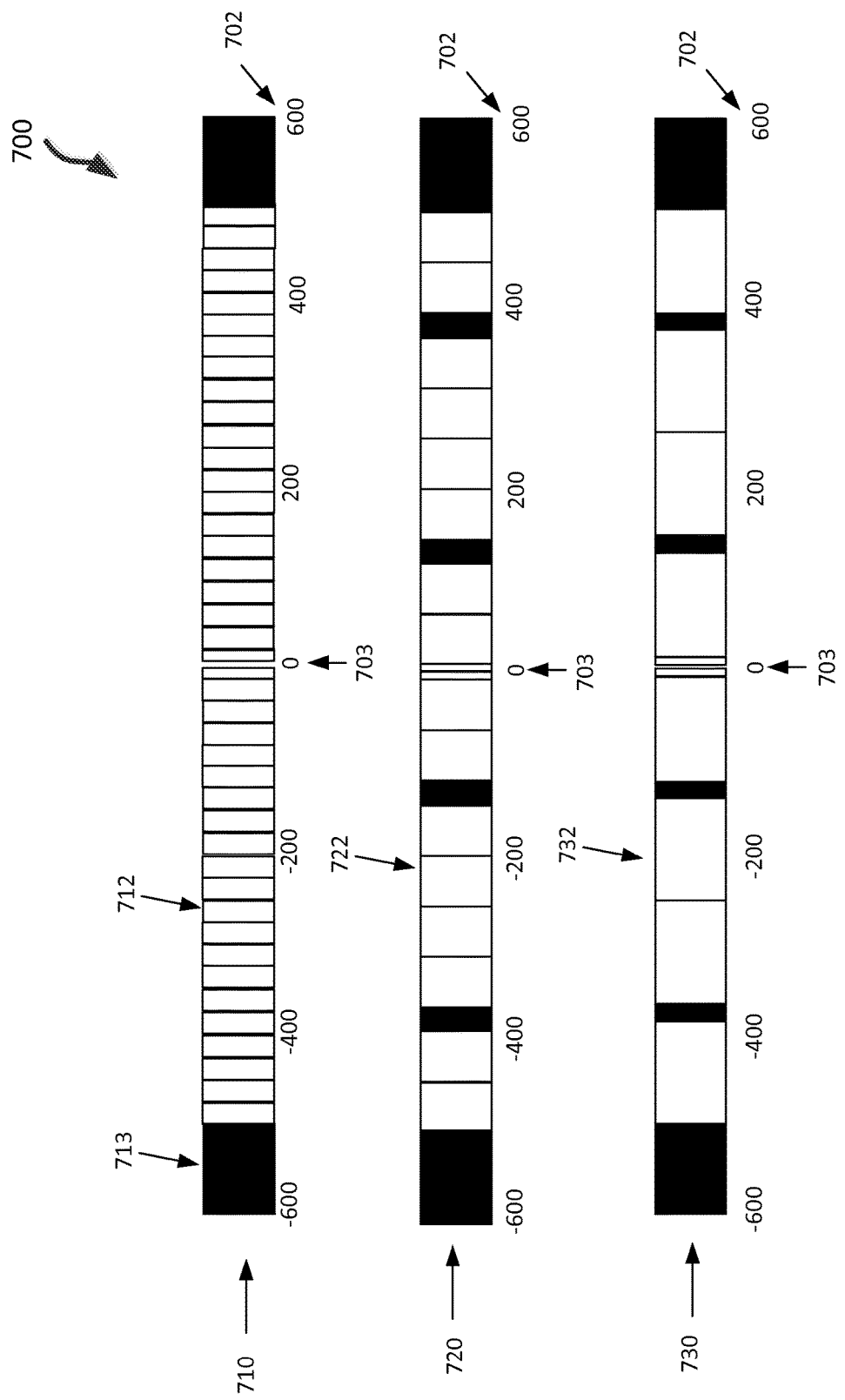
FIGS. 7 and 8 illustrate fixed position OFDMA resource units for 80 MHz in accordance with some embodiments.
Figure 8:
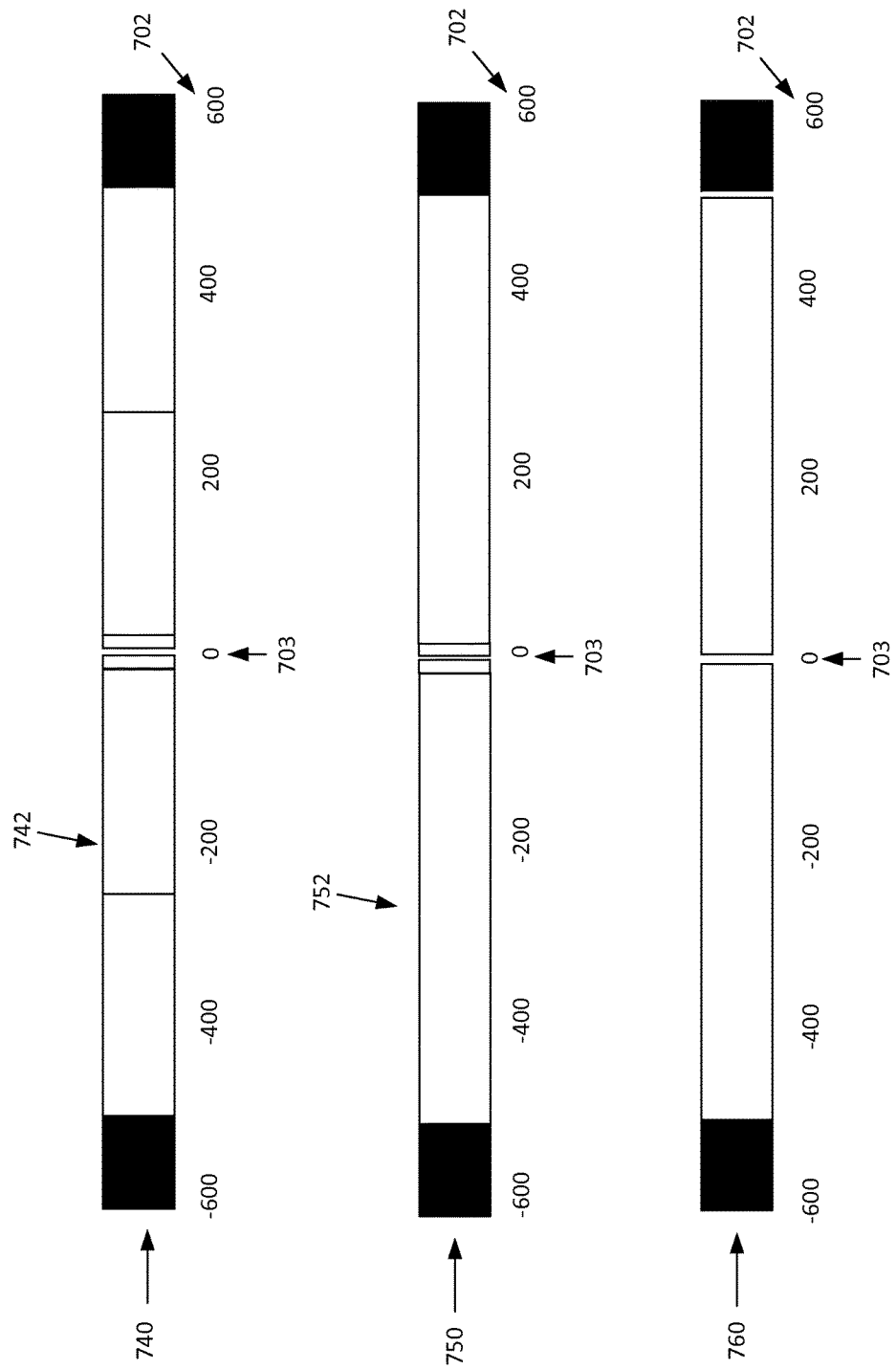

FIGS. 7 and 8 illustrate fixed position OFDMA resource units for 80 MHz in accordance with some embodiments. Illustrated in FIGS. 7 and 8 are different sub-channel designs 710, 720, 730, 740, 750, and 760. Illustrated along a horizontal axis is frequency 702. The DCs 703 may include tones that are not part of a RA. Sub-channel design 710 includes 28, 26 tone sub-channels 712 (non-shaded areas). Sub-channel design 720 includes 8, 52 tone sub-channels 722 (non-shaded areas). Sub-channel design 730 includes 4, 102 tone sub-channels 732 (non-shaded areas). Sub-channel design 740 includes 4, 242 tone sub-channels 742 (non-shaded areas). Sub-channel design 750 includes 2, 484 tone sub-channels 752 (non-shaded areas). Sub-channel design 760 includes 1, 996 tone sub-channel 762 (non-shaded areas), which may be a non-OFDMA sub-channel since only a single station may be assigned the sub-channel 762. The RAs may not be contiguous tones. There may be tones that are used for different purposes (e.g., guard tones such as 713) or that are unused between tones used for the RA. Moreover, there may be tones on either side of an RA that are used for different purposes (e.g., guard tones) or that are unused. In some embodiment a different fixed position OFDMA resource unit designs may be used.

Figure 9:
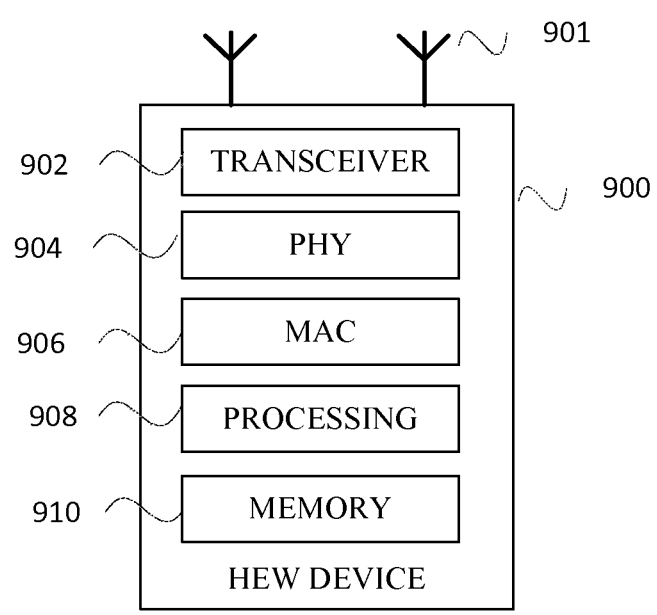
FIG. 9 illustrates a high-efficiency wireless (HEW) device in accordance with some embodiments.

FIG. 9 illustrates a HEW device 900 in accordance with some embodiments. HEW device 900 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 900 may be suitable for operating as master station 102 (FIG. 1) or a HEW STA 104 (FIG. 1). In accordance with embodiments, HEW device 900 may include, among other things, a transmit/receive element 901 (for example an antenna), a transceiver 902, physical (PHY) circuitry 904, and media access control (MAC) circuitry 906. PHY circuitry 904 and MAC circuitry 906 may be HEW compliant layers and may also be compliant with one or more legacy IEEE 802.13 standards. MAC circuitry 906 may be arranged to configure packets such as a physical layer convergence procedure (PLCP) protocol data unit (PPDUs) and arranged to transmit and receive PPDUs, among other things. HEW device 900 may also include circuitry 908 and memory 910 configured to perform the various operations described herein. The circuitry 908 may be coupled to the transceiver 902, which may be coupled to the transmit/receive element 901. While FIG. 9 depicts the circuitry 908 and the transceiver 902 as separate components, the circuitry 908 and the transceiver 902 may be integrated together in an electronic package or chip.

In some embodiments, the MAC circuitry 906 may be arranged to contend for a wireless medium during a contention period to receive control of the medium for the HEW control period and configure an HEW PPDU. In some embodiments, the MAC circuitry 906 may be arranged to contend for the wireless medium based on channel contention settings, a transmitting power level, and a CCA level.

The PHY circuitry 904 may be arranged to transmit the HEW PPDU. The PHY circuitry 904 may include circuitry for modulation/demodulation, upconversion/downconversion, filtering, amplification, etc. In some embodiments, the circuitry 908 may include one or more processors. The circuitry 908 may be configured to perform functions based on instructions being stored in a RAM or ROM, or based on special purpose circuitry. The circuitry 908 may include processing circuitry and/or transceiver circuitry in accordance with some embodiments. The circuitry 908 may include a processor such as a general purpose processor or special purpose processor. The circuitry 908 may implement one or more functions associated with transmit/receive elements 901, the transceiver 902, the PHY circuitry 904, the MAC circuitry 906, and/or the memory 910.

In some embodiments, the circuitry 908 may be configured to perform one or more of the functions and/or methods described herein and/or in conjunction with FIGS. 1-9.

In some embodiments, the transmit/receive elements 901 may be two or more antennas that may be coupled to the PHY circuitry 904 and arranged for sending and receiving signals including transmission of the HEW packets. The transceiver 902 may transmit and receive data such as HEW PPDU and packets that include an indication that the HEW device 900 should adapt the channel contention settings according to settings included in the packet. The memory 910 may store information for configuring the other circuitry to perform operations for configuring and transmitting HEW packets and performing the various operations to perform one or more of the functions and/or methods described herein and/or in conjunction with FIGS. 1-9.

In some embodiments, the HEW device 900 may be configured to communicate using OFDM communication signals over a multicarrier communication channel. In some embodiments, HEW device 900 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 900 may use 4× symbol duration of 802.11n or 802.11ac.

In some embodiments, an HEW device 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 901 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 900 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a high-efficiency (HE) wireless local area network (HEW) master station. The apparatus including transceiver circuitry and processing circuitry configured to generate a resource allocation for one or more HEW stations, wherein the resource allocation comprises a group identification and an index into a table, and transmit the resource allocation to the one or more HEW stations.

In Example 2, the subject matter of Example 1 can optionally include where the table is a permutation table that indicates orthogonal frequency division multi-access (OFDMA) resource allocations for the one or more HEW stations.

In Example 3, the subject matter of Example 1 or Example 2 can optionally include where the transceiver circuitry and processing circuitry is further configured to operate in accordance with one or more of: orthogonal frequency division multi-access (OFDMA) and multi-user multiple-input multiple-output (MU-MIMO).

In Example 4, the subject matter of any of Examples 1-3 can optionally include where the group identification is assigned to the one or more HEW stations when the one or more HEW stations associate with the master station and wherein the group identification is to signal at least one of the following group: OFDMA resource allocations and multi-user multiple-input multiple-output (MU-MIMO) resource allocations.

In Example 5, the subject matter of Examples 4 can optionally include where the transceiver circuitry and processing circuitry is further configured to use a different identification for the one or more HEW stations for signaling resource allocations for MU-MIMO.

In Example 6, the subject matter of any of Examples 1-5 can optionally include where the table is a permutation table that indicates one of a fixed number of sub-channel allocations for a bandwidth and the corresponding sub-channel allocation for each of the one or more of HEW stations.

In Example 7, the subject matter of any of Examples 1-6 can optionally include where the fixed number of sub-channel allocations for the bandwidth is one from the following group: twenty-eight 26 tone sub-channels; eight 52 tone sub-channels; four 102 tone sub-channels; four 242 tone sub-channels; two 484 tone sub-channels; and, one 996 tone sub-channel.

In Example 8, the subject matter of any of Examples 1-7 can optionally include where the transceiver circuitry and processing circuitry is further configured to transmit the resource allocation as a high-efficiency signal B (HE-SIG-B).

In Example 9, the subject matter of any of Examples 1-8 can optionally include where the resource allocation is part of a trigger frame that includes a duration for an uplink or downlink transmission opportunity and wherein the circuitry is further configured to transmit data to the one or more HEW stations in accordance with the resource allocation.

In Example 10, the subject matter of any of Examples 1-9 can optionally include where the transceiver circuitry and processing circuitry is further configured to operate in accordance with Institute of Electrical and Electronic Engineers (IEEE) 802.11ax.

In Example 11, the subject matter of any of Examples 1-10 can optionally include where the group identification is six bits and the index is from 3 bits to 6 bits inclusive of 3 bits and 6 bits.

In Example 12, the subject matter of any of Examples 1-11 can optionally include where the transceiver circuitry and processing circuitry is further configured to transmit an indication of a sub-channel design that includes an indication of sub-channel size and wherein the table is based on the sub-channel design.

In Example 13, the subject matter of any of Examples 1-12 can optionally include where the table is stored locally on both the master station and the one or more HEW stations; and, memory coupled to the transceiver circuitry and processing circuitry.

Example 14 is a non-transitory computer-readable storage medium that stores instructions for execution by one or more processors of a high-efficiency (HE) wireless local-area network (WLAN) (HEW) master station. The operations to configure the one or more processors to cause the HEW master station to generate a resource allocation for one or more HEW stations, wherein the resource allocation comprises a group identification and an index into a table, and transmit the resource allocation to the one or more HEW stations.

In Example 15, the subject matter of Example 14 can optionally include where the table is a permutation table that indicates a subchannel of a bandwidth for each of the one or more HEW stations.

In Example 16, the subject matter of Examples 14 or 15 can optionally include where the transceiver circuitry and processing circuitry is further configured to operate in accordance with orthogonal frequency division multi-access (OFDMA).

In Example 17, the subject matter of any of Examples 14-16 can optionally include where the group identification is assigned to the one or more HEW stations when the one or more HEW stations associate with the master stations and wherein the group identification is used to signal at least one of the following group: OFDMA resource allocations and multi-user multiple-input multiple-output (MU-MIMO) resource allocations.

Example 18 is an apparatus of a high-efficiency (HE) station comprising circuitry configured to receive a resource allocation for one or more HE stations, wherein the resource allocation comprises a group identification and a group index into a table, and determine the resource allocation for the HE station based on a table stored locally at the HE station, the group identification, and the group index. The circuitry is further configured to transmit or receive data in accordance with the resource allocation.

In Example 19, the subject matter of Example 18 can optionally include where the circuitry is further configured to receive the group identification and the group index from a master station.

In Example 20, the subject matter of Examples 18 or 19 can optionally include where the resource allocation is an orthogonal frequency division multi-access (OFDMA) resource allocation.

In Example 21, the subject matter of any of Examples 18-20 can optionally include where the circuitry is further configured to receive the resource allocation as a high-efficiency signal B (HE-SIG-B), and wherein the circuitry is further configured to operate in accordance with Institute of Electrical and Electronic Engineers (IEEE) 802.11ax.

In Example 22, the subject matter of any of Examples 18-21 can optionally include memory coupled to the circuitry; and, one or more antennas coupled to the circuitry.

Example 23 is a method performed by a high-efficiency (HE) wireless local area network (WLAN) (HEW) master station. The method includes generating a resource allocation for one or more HEW stations, where the resource allocation comprises a group identification and an index into a table, and transmitting the resource allocation to the one or more HEW stations.

In Example 24, the subject matter of Example 23 can optionally include where the table is a permutation table that indicates a subchannel of a bandwidth for each of the one or more HEW stations.

In Example 25, the subject matter of Examples 23 or 24 can optionally include transmitting in accordance with orthogonal frequency division multi-access (OFDMA).

Example 26 is an apparatus of a high-efficiency (HE) wireless local area network (HEW) master station. The apparatus including means for generating a resource allocation for one or more HEW stations, wherein the resource allocation comprises a group identification and an index into a table, and means for transmitting the resource allocation to the one or more HEW stations.

In Example 27, the subject matter of Example 26 can optionally include where the table is a permutation table that indicates orthogonal frequency division multi-access (OFDMA) resource allocations for the one or more HEW stations.

In Example 28, the subject matter of Examples 26 or 27 can optionally include means for operating in accordance with one or more of: orthogonal frequency division multi-access (OFDMA) and multi-user multiple-input multiple-output (MU-MIMO).

In Example 29, the subject matter of Example 28 can optionally include where the group identification is assigned to the one or more HEW stations when the one or more HEW stations associate with the master station and wherein the group identification is to signal at least one of the following group: OFDMA resource allocations and multi-user multiple-input multiple-output (MU-MIMO) resource allocations.

In Example 30, the subject matter of Example 29 can optionally include means for using a different identification for the one or more HEW stations for signaling resource allocations for MU-MIMO.

In Example 31, the subject matter of any of Examples 26-30 can optionally include where the table is a permutation table that indicates one of a fixed number of sub-channel allocations for a bandwidth and the corresponding sub-channel allocation for each of the one or more of HEW stations.

In Example 32, the subject matter of Example 31 can optionally include where the fixed number of sub-channel allocations for the bandwidth is one from the following group: twenty-eight 26 tone sub-channels; eight 52 tone sub-channels; four 102 tone sub-channels; four 242 tone sub-channels; two 484 tone sub-channels; and, one 996 tone sub-channel.

In Example 33, the subject matter of any of Examples 26-32 can optionally include means for transmitting the resource allocation as a high-efficiency signal B (HE-SIG-B).

In Example 34, the subject matter of Example 33 can optionally include where the resource allocation is part of a trigger frame that includes a duration for an uplink or downlink transmission opportunity and wherein the circuitry is further configured to transmit data to the one or more HEW stations in accordance with the resource allocation.

In Example 35, the subject matter of any of Examples 26-34 can optionally include means for operating in accordance with Institute of Electrical and Electronic Engineers (IEEE) 802.11ax.

In Example 36, the subject matter of any of Examples 26-35 can optionally include where the group identification is six bits and the index is from 3 bits to 6 bits inclusive of 3 bits and 6 bits.

In Example 37, the subject matter of any of Examples 26-36 can optionally include means for transmitting an indication of a sub-channel design that includes an indication of sub-channel size and wherein the table is based on the sub-channel design.

In Example 38, the subject matter of any of Examples 26-37 can optionally include where the table is stored locally on both the master station and the one or more HEW stations; and, memory coupled to the transceiver circuitry and processing circuitry.

Example 39 is an apparatus of a high-efficiency (HE) station, the HE station comprising means for receiving a resource allocation for one or more HE stations, where the resource allocation comprises a group identification and a group index into a table, and means for determining the resource allocation for the HE station based on a table stored locally at the HE station, the group identification, and the group index. The apparatus further comprising means for transmitting or receiving data in accordance with the resource allocation.

In Example 40, the subject matter of Example 39 can optionally include where the apparatus further comprises means for receiving the group identification and the group index from a master station.

In Example 41, the subject matter of Examples 39 or 40 can optionally include where the resource allocation is an orthogonal frequency division multi-access (OFDMA) resource allocation.

In Example 42, the subject matter of any of Examples 39-41 can optionally where the apparatus further comprises means for receiving the resource allocation as a high-efficiency signal B (HE-SIG-B), and wherein the circuitry is further configured to operate in accordance with Institute of Electrical and Electronic Engineers (IEEE) 802.11ax.

In Example 43, the subject matter of any of Examples 39-42 can optionally include where the apparatus further includes means for storing and retrieving resource allocations.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the apparatus comprising: memory; and, processing circuitry coupled to the memory, the processing circuitry configured to:
    encode a resource allocation, wherein the resource allocation comprises a group identification field, a group index field, and a table index field, wherein a value of the group identification field indicates a group of two or more HE stations, a value of the group index field indicates a permutation, and a value of the table index field indicates a resource unit (RU) design of a table of RU designs, and wherein the permutation indicates for each of the one or more HE stations which RU of the RU design is for a corresponding HE station; and
    cause the HE AP to transmit the resource allocation to the one or more HE stations.

2. The apparatus of claim 1, wherein the table of RU designs is a table that indicates, orthogonal frequency division multi-access (OFDMA) RUs for the one or more HE stations.

3. The apparatus of claim 1, wherein the processing circuitry is further configured to operate in accordance with one or more of: orthogonal frequency division multi-access (OFDMA) and multi-user multiple-input multiple-output (MU-MIMO).

4. The apparatus of claim 3, wherein a group identification indicated by the group identification field is assigned to each of the one or more HE stations when the one or more HE stations associate with the HE AP.

5. The apparatus of claim 4, wherein the processing circuitry is further configured to use a different group identification for the one or more HE stations for signaling resource allocations for MU-MIMO.

6. The apparatus of claim 1, wherein the value of the group index field indicates an index into a permutation table that indicates the permutation of the one or more HE stations.

7. The apparatus of claim 2, wherein the OFDMA RUs are each one from the following group:
    twenty-eight 26 tone sub-channels; eight 52 tone sub-channels; four 102 tone sub-channels; four 242 tone sub-channels; two 484 tone sub-channels; and, one 996 tone sub-channel.

8. The apparatus of claim 1, wherein the processing circuitry is further configured to transmit the resource allocation as a high-efficiency signal B (HE-SIG-B).

9. The apparatus of claim 1, wherein the resource allocation is part of a trigger frame that includes a duration for an uplink or downlink transmission opportunity and wherein the circuitry is further configured to transmit data to the one or more HE stations in accordance with the resource allocation.

10. The apparatus of claim 1, wherein the processing circuitry is further configured to operate in accordance with Institute of Electrical and Electronic Engineers (IEEE) 802.11ax.

11. The apparatus of claim 1, wherein the group identification is six bits and the index field is from 3 bits to 6 bits inclusive of 3 bits and 6 bits.

12. The apparatus of claim 1, wherein the table of RU designs is stored locally on both the master station and the one or more HE stations; and, wherein the apparatus further comprises: memory coupled to the transceiver circuitry and processing circuitry.

13. The apparatus of claim 1, wherein the memory is configured to store the resource allocation.

14. A non-transitory computer-readable storage medium that stores instructions for execution by one or more processors of a high-efficiency (HE) access point (AP), the instructions to configure the one or more processors to:
    encode a resource allocation, wherein the resource allocation comprises a group identification field, a group index field, and a table index field, wherein a value of the group identification field indicates a group of two or more HE stations, a value of the group index field indicates a permutation, and a value of the table index field indicates a resource unit (RU) design of a table of RU designs, and wherein the permutation indicates for each of the one or more HE stations which RU of the RU design is for a corresponding HE station; and cause the HE AP to transmit the resource allocation to the one or more HE stations.

15. The non-transitory computer-readable storage medium of claim 14, wherein the table of RU designs is a table that indicates, orthogonal frequency division multi-access (OFDMA) RUs for the one or more HE stations.

16. The non-transitory computer-readable storage medium of claim 14, wherein the instructions are further configured to operate in accordance with orthogonal frequency division multi-access (OFDMA).

17. The non-transitory computer-readable storage medium of claim 14, wherein a group identification indicated by the group identification field is assigned to each of the one or more HE stations when the one or more HE stations associate with the HE AP.

18. An apparatus of a high-efficiency (HE) station comprising: memory; and, processing circuitry coupled to the memory, the processing circuitry configured to:

decode a resource allocation, wherein the resource allocation comprises a group identification field, a group index field, and a table index field, wherein a value of the group identification field indicates a group of two or more HE stations, the group comprising the HE station, a value of the group index field indicates a permutation of the one or more HE stations, and a value of the table index field indicates a resource unit (RU) design of a table of RU designs;

determine the resource allocation for the HE station based on a position of the HE station in the permutation of the one or more HE stations, and the RU design; and cause the HE station to transmit or receive data in accordance with the resource allocation.

19. The apparatus of claim 18, wherein the processing circuitry is further configured to:

receive the group identification and the group index from a HE access point.

20. The apparatus of claim 18, wherein the resource allocation is an orthogonal frequency division multi-access (OFDMA) resource allocation.

21. The apparatus of claim 18, wherein the processing circuitry is further configured to receive the resource allocation as a high-efficiency signal B (HE-SIG-B), and wherein the circuitry is further configured to operate in accordance with Institute of Electrical and Electronic Engineers (IEEE) 802.11ax.

22. The apparatus of claim 18, further comprising transceiver circuitry coupled to the processing circuitry; and, one or more antennas coupled to the transceiver circuitry.

23. A method performed by a high-efficiency (HE) access point (AP), the method comprising:

encoding a resource allocation, wherein the resource allocation comprises a group identification field, a group index field, and a table index field, wherein a value of the group identification field indicates a group of two or more HE stations, a value of the group index field indicates a permutation, and a value of the table index field indicates a resource unit (RU) design of a table of RU designs, and wherein the permutation indicates for each of the one or more HE stations which RU of the RU design is for a corresponding HE station; and causing the HE AP to transmit the resource allocation to the one or more HE stations.

24. The method of claim 23, wherein the table of RU designs is a table that indicates, orthogonal frequency division multi-access (OFDMA) RUs for the one or more HE stations.

25. The method of claim 23, further comprising:

transmitting in accordance with orthogonal frequency division multi-access (OFDMA).

\* \* \* \* \*